United States Patent Office 3,143,893
Patented Aug. 11, 1964

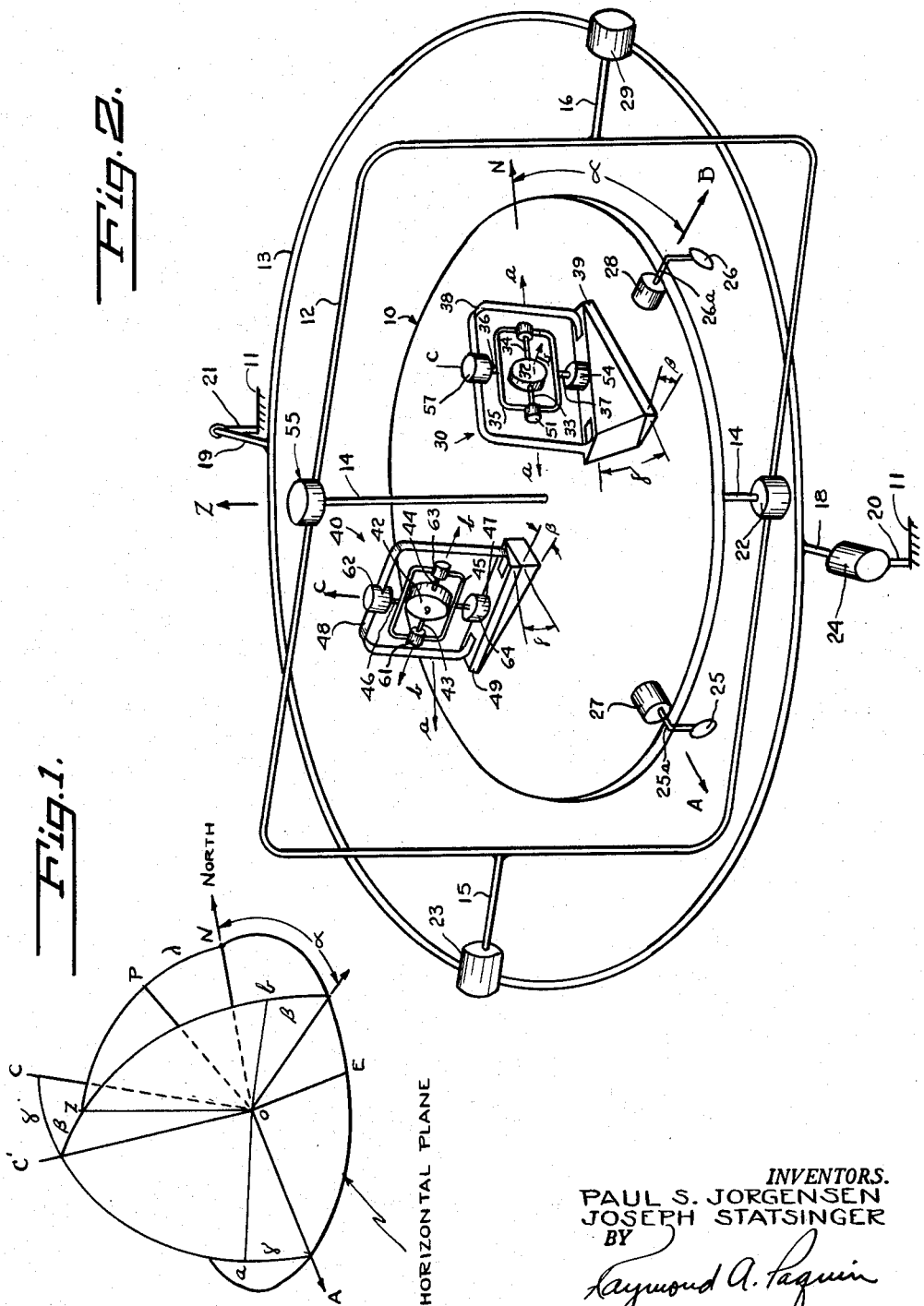

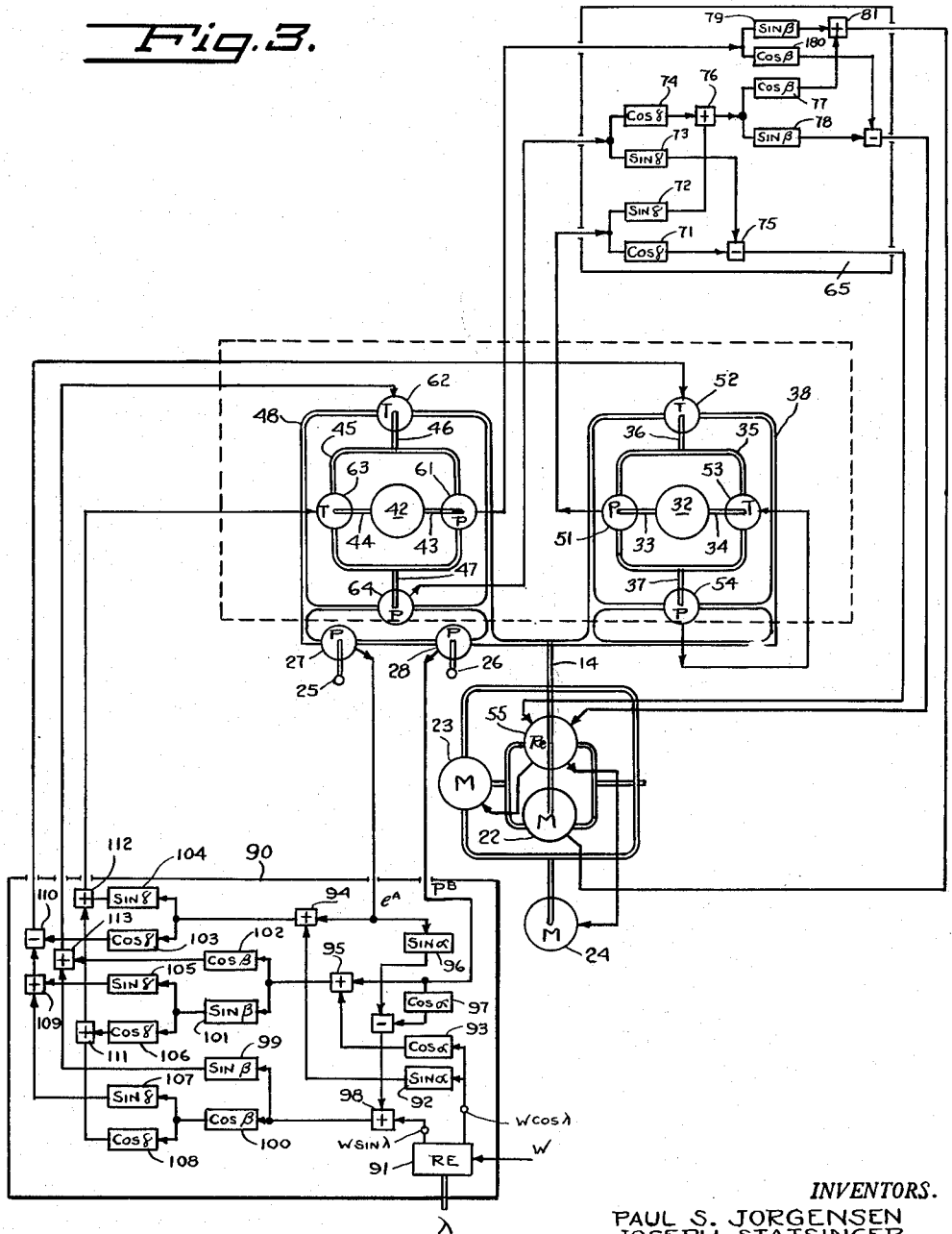

3,143,893
ALIGNMENT SYSTEM FOR INERTIAL
PLATFORM
Paul S. Jorgensen, Westbury, and Joseph Statsinger, Syosett, N.Y., assignors to American Bosch Arma Corporation, a corporation of New York
Filed Oct. 26, 1959, Ser. No. 848,637
8 Claims. (Cl. 74—5.34)

The present invention relates to inertial platforms and has particular reference to the automatic initial alignment of such platforms.

In inertial navigation systems, the acceleration of the vehicle is sensed in three orthogonal directions by three accelerometers maintained in a constant orientation in space by a gyroscopically controlled inertial platform. The accelerometer outputs are integrated twice with respect to time to determine the distance covered during travel along these axes and appropriate conversions are made to refer these distances to earth coordinates.

The platform is usually initially oriented so as to direct the accelerometer axes along the local vertical and in the north-south and east-west directions in the horizontal plane. The gyroscope axes are normally oriented accordingly.

However, it has been found that for minimization of the effects of certain accelerations on the gyroscopes, or for reasons of accuracy and instrument limitations, it is advantageous to initially align the gyroscope axes in directions displaced from the meridian and inclined to the horizontal while the accelerometer axes are retained vertical and horizontal in the north-south and east-west directions.

Accordingly, this invention is a system for automatically positioning the platform by means of gyroscopes having axes which are arbitrarily oriented relative to the earth coordinates.

The platform carries a set of gyroscopes, either two two-degree-of-freedom or three single-degree-of-freedom gyros, whose spin axes define an orthogonal set of axes which are selectedly positioned with respect to the platform coordinates and thereby define the platform coordinates as well. The desired orientation of the platform itself is horizontal with a pair of orthogonal reference axes, one of which is displaced by a chosen angle from the meridian.

The instrumentation for automatically positioning the platform coordinates into the arbitrarily desired orientation relatively to the earth coordinates according to this invention is accomplished by applying appropriate torques to the gyros thereby causing platform rotation, through follow-up means, until the platform has settled to the desired orientation. The voltages which position the platform about the horizontal axes are obtained from pendulums mounted on the platform with their sensitive axes along the horizontal reference axes of the platform. Alignment about the vertical is accomplished by virtue of the platform being able to detect the orientation of the earth's axis of rotation, somewhat in the maner of a gyroscopic compass. The essential difference is that while a gyro compass settles with the spin axis of the gyro on the line formed by the intersection of the horizontal and meridional planes, the platform is caused to assume a desired predetermined orientation relative to the local earth coordinates.

According to the present invention, the gyroscope frames are tilted with respect to the platform at chosen angles, and the platform is driven so as to keep the inner and outer gyro gimbal frames perpendicular to the gyro spin axes in response to error signals from the gyro pickoffs. A computer for transposing the errors from the gyro coordinates to the coordinates of the follow-up system is interposed between the pickoffs and the follow-up motors.

The pendulums on the platform indicate the misalignment of the platform about a pair of orthogonal axes out of the horizontal plane. A second computer for transforming the misalignment signals in the platform coordinates into error signals in the gyro coordinates is interposed between the pendulum pickoffs and the gyro torquing devices. The computer is also supplied with signals proportional to the earth's rate of rotation, W, and the latitude, $\lambda$, of the geographical position of the platform to cause precession of the gyros at a rate equal to the earth's rotation so as to keep the platform horizontal at all times. Torques proportional to the pendulum pickoff outputs applied to the gyro cause the platform to be aligned about the horizontal axes. Torques proportional to a linear combination of the pendulum outputs applied to the gyros also cause the platform to be aligned about the vertical axis.

If the platform is not initially aligned properly about the vertical, the rotation of the platform will be about an axis not coincident with the earth's polar axis and the resulting net platform rotation relative to earth causes pendulum output voltages to be developed. The coupling of the pendulums to the platform causes the platform to be rotated about all of its axes so as to drive both the relative rotation and the pendulum outputs to zero.

For a better understanding of this invention, reference may be had to the accompanying diagrams, in which FIG. 1 is an explanatory sketch of the geometry of the invention;

FIG. 2 shows schematically a preferred mechanical construction of the platform; and FIG. 3 illustrates the electrical corrections between the elements of FIG. 2.

Referring now to FIG. 1 of the drawings, the geometrical relationships of the various axes is described. ON is the intersection of the meridional plane ONZ and the horizontal plane ONE at the initial position, whence ON is oriented in the north-south horizontal direction, OE is oriented in the east-west horizontal direction and OZ is oriented along the local vertical. The angle PON is the local latitude angle, $\lambda$.

For the reasons previously mentioned, it is desirable to orient the gyro axes along at least two of the mutually perpendicular axes, $ob$, $oa$ and $oc$ which are defined by the angles $\alpha$, $\beta$, and $\gamma$. Thus the arc $\alpha$ is generated about OZ to locate the axes OB and OA, $\beta$ is generated about OA to give $ob$, and $\lambda$ is generated about $ob$ to give $oa$ and $oc$, which is perpendicular to both $oa$ and $ob$. The platform axes are defined as the OA, OB and OZ axes. To attain this orientation calibrated torques are applied to the gyros to rotate the platform at a rate equal to the earth's rotation and to align the platform about the horizontal and vertical axes.

Referring now to FIG. 2 of the drawings, a platform 10 is universally suspended from deck 11 in the roll and pitch gimbals 12, 13. The platform 10 is supported by the vertical shaft 14 in the roll gimbal frame 12, for rotation therein, while the shafts 15, 16 support the gimbal frame 12 in the pitch gimbal ring 13. Shafts 18, 19 perpendicularly disposed to shafts 15, 16, support the gimbal ring 13 in the supporting members 20, 21 which are attached to the deck 11. Shafts 14, 15 and 18 are connected to the rotors of follow-up motors 22, 23 and 24 respectively, the stators of which are carried by the respective gimbal frame 12, gimbal ring 13 and support 20.

The platform 10 carries a pair of pendulums 25, 26 and associated pickoff devices 27, 28 which are arranged to detect tilts of the platform 10 out of the horizontal about the orthogonally disposed axes through the shafts 25a, 26a of the pickoff devices 27, 28.

Also carried by the platform 10 are a pair of two degree of freedom gyros 30, 40 which are fastened to the platform 10 so as to have their spin axes normally inclined to the platform 10 as will be described.

In the illustration, FIG. 2, the spinning wheel of gyro 30 is mounted in its casing 32 which is supported by shafts 33, 34 in the gimbal frame 35. The shafts 36, 37 which are perpendicular to shafts 33, 34 support the gimbal frame 35 in the outer frame 38. The outer frame 38 is secured to a compound wedge-shaped base 39 which supports the frame 38 in a manner such that shafts 36, 37 are aligned with the oc axis of FIG. 1, and when frames 35 and 38 are coplanar the shafts 33, 34 are aligned with the oa axis of FIG. 1.

Similarly, the gyro 40 includes a casing 42 supported by shafts 43, 44 in the gimbal frame 45 which, in turn, is supported in an outer frame 48 by the shafts 46, 47. The frame 48 is attached to a wedge-shaped base 49 which is secured to the platform 10 so that the shafts 46, 47 are aligned with axis oc of FIG. 1 and shafts 43, 44 are aligned with the ob axis when frames 45 and 48 are coplanar. It will be seen that in the normal operation the spin axes of the gyros 30, 40 being maintained perpendicular to their supporting shafts, as will be shown, are respectively aligned along the ob and oa axes of FIG. 1.

In order to accomplish the alignment of the gyros as stated, torquing means and follow-up motors are mechanically connected as shown in FIG. 2 and electrically connected as illustrated in FIG. 3.

Thus, shafts 33, 37, 43, 47 are mechanically connected to pickoff devices 51, 54, 61, 64 respectively and shafts 34, 36, 44 and 46 are mechanically connected to torquing motors 53, 52, 63, 62 respectively. The vertical shaft 14 of the platform 10 is mechanically connected to the rotor of a resolver 55 as well as the follow-up motor 22.

Referring now to FIG. 3, the electrical connections are represented as in a conventional single-line wiring diagram for ease and clarity, and for the same reason such necessary components as scaling devices and amplifiers are omitted from the diagram, but their use will be evident to those skilled in the art. Also the particular type of follow-up motors, torquing devices and pickoffs are not important but preferably take the form of two-phase induction devices well known in the art. Thus, the speed of a follow-up motor is proportional to the magnitude of its input signal, the torque output of a torquing device is proportional to the magnitude of its input signal and the output signal of a pickoff is proportional to the displacement between its relatively movable members, the rotor and stator, for example.

As shown in FIG. 3, the outputs of the pickoffs 51, 61 and 62 jointly energize the follow-up motors 22, 23 and 24 through the computing unit 65 and the resolver 56, as will be described, so that the motors 22, 23 and 24 keep the platform 10 aligned according to the axes of gyros 30 and 40 by driving the outputs of pickoffs 51, 61 and 62 to zero.

The pickoff device 52 is applied directly to the torquing device 53 in order to maintain the frame 35 coplanar with the frame 38, by causing precession of the gyro 32 in the proper direction whenever a displacement exists between the two frames.

It will be seen therefore that the output of pickoff 51 is representative of the displacement of the frames 35 and 38 from the plane of the gyro 32 about the axis through shafts 33, 34 and represents also the rotation of platform 10 about oa of FIG. 1 which will be required to reduce the pickoff 51 output to zero.

Similarly the output of pickoff 61 which represents the displacement of frame 45 from the plane of gyro 42 about the axis through shafts 43, 44 is also representative of the rotation of the platform 10 about axis ob which will be required to reduce the pickoff 61 output to zero.

Furthermore, the output of pickoff 62 which represents the displacement of fame 48 from the plane of gyro 42 about the axis through shafts 46, 47 also represents the rotation of platform 10 about the axis oc of FIG. 1 required to reduce the pickoff 62 output to zero.

Since the platform 10 cannot physically be rotated about the axes oa, ob and oc, these rotations are resolved into rotations about the vertical axis OZ through shafts 14, and the horizontal axes OA and OB through the shafts 25a and 26a of the pendulums 25, 26, the latter rotations are further resolved into rotations about the axes through shafts 15 and 18 of motors 23, 24.

If the displacements, or rotations required, about the axes oa, ob and oc are designated as $\Delta_a$, $\Delta_b$, and $\Delta_c$ it will be found by trigonometric transformation that the rotations about the OZ, OA and OB axes are respectively:

$$\Delta_Z = \Delta_a \sin \gamma \cos \beta + \Delta_b \sin \beta + \Delta_c \cos \gamma \cos \beta \quad (1)$$

$$\Delta_A = \Delta_a \cos \gamma - \Delta_c \sin \gamma \quad (2)$$

$$\Delta_B = -\Delta_a \sin \gamma \sin \beta + \Delta_b \cos \beta - \Delta_c \cos \gamma \sin \beta \quad (3)$$

Thus, the signals $\Delta_a$ and $\Delta_c$ from pickoff 51 and 62 are resolved into the components $\Delta_a \cos \gamma$, $\Delta_a \sin \gamma$, $\Delta_c \sin \gamma$ and $\Delta_c \cos \gamma$ in voltage dividers 71, 72, 73, 74 respectively. The signals from the voltage dividers 71 and 73 are combined at 75 to produce a signal proportional to $\Delta_a \cos \gamma - \Delta_c \sin \gamma$ which is equal to $\Delta_A$ from Equation 2 above.

The signals from voltage dividers 72 and 74 are combined at 76 and resolved into values proportional to $(\Delta_a \sin \gamma + \Delta_c \cos \gamma) \cos \beta$ and $(\Delta_a \sin \gamma + \Delta_c \cos \gamma) \sin \beta$ in the voltage dividers 77 and 78 respectively. These signals are combined with the several $\Delta_b \sin \beta$ and $\Delta_b \cos \beta$ signals from voltage dividers 79 and 80 at 81 and 82 respectively, to produce signals proportional to $\Delta_Z$ and $\Delta_B$, as seen from the Equations 1 and 3 above.

The rotations about OA and OB are further resolved into rotations about the horizontal axes in the fore and aft and thwartship directions in the resolver 55. Thus, the signals from 75 to 82 are applied to the stator windings of resolver 55, the rotor windings of which are displaced thereto by the angle between the fore and aft axis, axis through shafts 15 and 16, and the axis through shaft 26a of the pendulum 26, i.e., the angle $\phi$. The outputs of the resolver 55 secondary windings are therefore:

$$\Delta_R = \Delta_A \sin \phi + \Delta_B \cos \phi$$

and $$\Delta_P = \Delta_A \cos \phi - \Delta_B \sin \phi$$

The R signal is applied to motor 23 which drives the platform 10 about the horizontal shaft 15, 16 accordingly. The $\Delta_P$ signal is applied to motor 24 which drives platform 10 about the substantially horizontal shafts 18, 19 accordingly. The small error which may result when a roll angle exists may be neglected.

Basically the operation of the alignment system may be analyzed according to the following steps although in practice these steps are all occurring more-or-less simultaneously.

Assuming first that the platform 10 has been tilted out of the horizontal it will be seen that the tilt causes signals to be produced in the pendulum pickoffs 27 and 28. These signals are adapted to energize the torque motors 54, 63, 64 of gyros 42 and 43, as will be described, to cause precession of the gyros and subsequent follow-up of the platform, as previously described, toward the horizontal.

When the platform becomes horizontal the rotation of the earth disturbs the horizontal position and the platform tilts.

Computed signals, proportional to the effects of the earth's rotation about the vertical axis and about a pair of orthogonal horizontal axes, which are displaced by an angle α from the N-S and E-W directions, are applied to the gyros to cause counter rotation of the platform which tends to keep the platform horizontal.

If the platform is misoriented in azimuth, i.e., the pendulum 26a is not displaced from the meridian by the angle α, the rotation of the platform is about an axis not coincident with the earth's polar axis and there will be a net rotation of the platform out of the horizontal since the effect of the earth's rotation and the effect of the computed counter rotation signals do not cancel. The tilt of the platform causes pendulum outputs which in turn cause rotation of the platform in azimuth through the action of the gyros and their follow-up system to reduce the effect of earth's rotation. In addition, the pendulum outputs cause rotation of the platform in tilt to return it to the horizontal. When the platform attains its settled position, the axis of pendulum 26 is displaced by the angle α from the meridian and the platform 10 is horizontal. The spin axis of the gyro 32 is then aligned along the ob axis while the spin axis of gyro 42 is aligned with the oa axis.

This general operation is carried on in accordance with the detailed operation explained below.

If the platform 10 is not horizontal, signals OA and OB are produced in the pendulum pickoff devices 27 and 28 which are indicative of these tilts of the platform out of the horizontal about the axes through shafts 25a and 26a and proportional to the rotation of platform 10 about these axes which will reduce the tilt of the platform to zero. When the platform is horizontal, rotation of the earth will cause the platform to become tilted with respect to the horizontal unless the platform is rotated about the vertical and horizontal north-south axes at known rates proportional to the horizontal and vertical components of the rate of earth's rotation. For this purpose, the platform rotation about the vertical OZ axis must be proportional to $W \sin \lambda$ and about the horizontal north-south axis must be $W \cos \lambda$, where W is the rate of rotation of the earth about its axis and λ is the latitude angle.

The rotation about the north-south axis is resolved into component rotations about the horizontal axes OA and OB, where OB is displaced from the north-south meridian by the chosen angle α. If these required rotations are used to control the orientation of the platform about the axes through the shafts 25a and 26a of the pendulum pickoffs 27, 28 in conjunction with the outputs of the pendulum pickoffs it will be shown that the platform 10 will be settled in the horizontal with the axis of shaft 26a angularly displaced from the meridian by the angle α. Any other alignment will cause the platform 10 to be rotated to the desired position.

For this purpose, the computer 90 is interposed between the pendulum pickoffs 27 and 28 and the torquing devices 54, 64 and 63 of the gyros 30, 40. Also supplied to the computer 90 are quantities proportional to W and λ, which when applied to the resolver 91 produce signals proportional to $W \sin \lambda$ and $W \cos \lambda$.

The $W \cos \lambda$ signal is resolved into signals proportional to $W \cos \lambda \sin \alpha$ and $W \cos \lambda \cos \alpha$ in the voltage dividers 92 and 93, and these component values are added to the ρA and ρB signals from the pendulum pickoff dividers 27 and 28 at 94 and 95 to provide signals designated as $W_A$ and $W_B$, respectively. Also, the components of ρA and ρB in the direction displaced from the axis of shaft 26a by the angle α are determined in the voltage dividers 96, 97 and the outputs thereof are combined at 98 with the $W \sin \lambda$ signal from resolver 91 to produce the signal proportional to $W_Z = W \sin \lambda + K_2 (\rho B \cos \alpha - \rho A \sin \alpha)$. The portion in parentheses represents rotation of the platform in azimuth in response to the pendulum outputs which arise as a result of platform tilt. This corresponds to the effect of apparent rise of the easterly end of the spin axis of a gyro which is used in the gyro compass to cause the gyro to seek the meridian; similarly, the $\rho B \cos \alpha - \rho A \sin \alpha$ signal is used to precess the platform 10 until the axis through the shaft 26a is directed at an angle α from the meridian. At this point the platform rotation about the horizontal north-south axis will be exactly that required to keep the platform horizontal and the outputs of the pendulum pickoffs 27, 28 will be zero.

Now, since the precession axes of the gyros 32 and 42 are directed according to the oc, oa and ob axes of FIG. 1 and not along the OZ, OA and OB axes, the computer 91 performs a rotation of coordinates to provide the desired signals to the gyros 32, 42. Thus, the $W_Z$ signal is resolved into $W_Z \sin \beta$ and $W_Z \cos \beta$ in voltage dividers 99, 100 and the $W_B$ signal is resolved into components $W_B \sin \beta$ and $W_B \cos \beta$ in the voltage dividers 101, 102. The rotation about ob is then obtained by combining the outputs of voltage dividers 99 and 102 at 113 into $W_b = W_B \cos \beta + W_Z \sin \beta$ which may also be written as:

$W_b = (\rho B + W \cos \lambda \cos \alpha) \cos \beta$
$\qquad + [K_2(\rho B \cos \alpha - \rho A \sin \alpha) + W \sin \lambda] \sin \beta$ The $W_A$ signal from 94, the $W_B \sin \beta$ signal from voltage divider 101 and the $W_Z \cos \beta$ signal from voltage divider 100 are each resolved into components about oa and oc in the voltage dividers 104 through 108 inclusive and the outputs thereof are combined to produce the desired rotational signals. Thus, the $W_Z \cos \beta \sin \gamma$ output of voltage divider 107 is added to the $W_B \sin \beta \sin \gamma$ output of voltage divider 105 at 109 and the $W_A \cos \gamma$ output of voltage divider 103 is subtracted at 110 to produce the $W_a$ signal which is:

$W_a = W_Z \cos \beta \sin \gamma + W_B \sin \beta \sin \gamma - W_A \cos \gamma$ or, which in terms of W and the displacements ρA and ρB may be written as:

$W_a = [K_2(\rho B \cos \alpha - \rho A \sin \alpha) + W \sin \lambda]$
$\qquad \cos \beta \sin \gamma + [(\rho B + W \cos \lambda \cos \alpha)]$
$\qquad \sin \beta \sin \gamma - (\rho A + W \cos \lambda \sin \alpha) \cos \gamma$ Also, the $W_Z \cos \beta \cos \gamma$ signal from voltage divider 108 is added to the $W_B \sin \beta \cos \gamma$ signal from voltage divider 106 at 111 and the sum is added to the $W_A \sin \gamma$ signal from voltage divider 104 at 112 to produce a signal proportional to $W_c$ according to the relationship:

$W_c = W_Z \cos \beta \cos \gamma + W_B \sin \beta \cos \gamma + W_A \sin \gamma$ or, in terms of W, ρA and ρB, $W_c = [K_2(\rho B \cos \alpha - \rho A \sin \alpha) + W \sin \lambda]$
$\qquad \cos \beta \cos \gamma + [\rho B + W \cos \lambda \cos \alpha] \sin \beta$
$\qquad \cos \gamma + [\rho A + W \cos \lambda \sin \alpha] \sin \gamma$ In order to obtain the desired rotation of the platform about the oa, ob and oc axes, the gyros 32 and 42 are precessed according to the $W_a$, $W_b$ and $W_c$ signals from 110, 113 and 112 by applying these signals to the torque motors 54, 64 and 63 respectively. As the gyros 32 and 42 precess at the desired rates, the platform 10 is caused to follow the gyro by the follow-up action previously described. It will be seen that the platform 10 is driven in the direction tending to reduce the pickoff 25 and 27 output to zero, and to maintain the pickoff outputs at zero. This condition is reached when the platform 10 is horizontal, the axis of shaft 26a is directed at an angle α from the meridian, the platform 10 is rotating about the horizontal north-south axis at a rate $W \cos \lambda$ and about the vertical axis at a rate $W \sin \lambda$.

The description herein has been directed particularly to a platform controlled by a pair of two degree of freedom gyros having spin axes along the ob and oa axes with one slaved to the other about the oc axes. The invention, however, is not to be limited to this embodiment since other configurations of two gyro control can be devised. Furthermore, three single degree of freedom gyros having spin axes along the oa, ob and oc axes and slaved to perpendicularity with each other can be used without departing from the invention. Thus, the dotted rectangle of FIG. 3 may contain other gyro configurations than those shown, but the signals from computer 90 would be applied to the gyros so as to cause gyro precession about the *oa, ob* and *oc* axes while the signals to the computer 65 would represent misalignment of the gyro coordinates with coordinates fixed according to the α, β and γ angles with respect to the platform 10.

We claim:

1. In an inertial platform device, a platform, a pair of two degree of freedom gyroscopes, means for mounting said pair of gyyroscopes on said platform gimbal means for one of said gyroscopes for supporting said gyroscope about a pair of orthogonal axes, said mounting means being adapted to incline said orthogonal axes relative to said platform.

2. In an inertial platform device, a platform, a pair of two degree of freedom gyroscopes, means for mounting said pair of gyroscopes on said platform, gimbal means for one of said gyroscopes for supporting said gyroscope about a pair of orthogonal axes, said mounting means being adapted to incline said orthogonal axes relative to said platform and second gimbal means for the second of said gyroscopes for supporting said gyroscope about a second pair of orthogonal axes, said mounting means being adapted to incline said second pair of orthogonal axes relative to said platform.

3. In an inertial platform device, a platform, a pair of two degree of freedom gyroscopes, means for mounting said pair of gyroscopes on said platform, gimbal means for one of said gyroscopes for supporting said gyroscope about a pair of orthogonal axes, which axes are mutually perpendicular to the gyroscope spin axis, said mounting means being adapted to incline said orthogonal axes relative to said platform.

4. In an intertial platform device, a platform, a pair of two degree of freedom gyroscopes, means for mounting said pair of gyroscopes on said platform, gimbal means for one of said gyroscopes for supporting said gyroscope about a pair of orthogonal axes, which axes are mutually perpendicular to the gyroscope spin axis, said mounting means being adapted to incline said orthogonal axes relative to said platform and second gimbal means for the second of said gyroscopes for supporting said gyroscope about a second pair of orthogonal axes, said mounting means being adapted to incline said second pair of orthogonal axes relative to said platform.

5. In an intertial platform device, a platform, a pair of gyroscopes, means for mounting and positioning said pair of gyroscopes on said platform with the spin axes of said gyroscopes perpendicular to each other, at least one of said axes being inclined relative to said platform, and including a pair of pendulums on said platform, computing means for applying the pendulum outputs to said gyroscopes, control means for said platform and second computer means actuated by said gyroscopes for energizing said control means.

6. In an inertial platform device, a platform, a plurality of gyroscopes, means for mounting and positioning said plurality of gyroscopes on said platform with the spin axes of said gyroscopes perpendicular to each other, at least one of said axes being inclined relative to said platform, and including a pair of pendulums on said platform, computing means for applying the pendulum outputs to said gyroscopes, control means for said platform and second computer means actuated by said gyroscopes for energizing said control means.

7. In an inertial platform device, a platform, a pair of gyroscopes, means for mounting and positioning said pair of gyroscopes on said platform with the spin axes of said gyroscopes perpendicular to each other, at least one of said axes being inclined relative to said platform and displaced from the geographic meridian, and including a pair of pendulums on said platform, computing means for applying the pendulum outputs to said gyroscopes, control means for said platform and second computer means actuated by said gyroscopes for energizing said control means.

8. In an inertial platform device, a platform, a plurality of gyroscopes, means for mounting and positioning said plurality of gyroscopes on said platform with the spin axes of said gyroscopes perpendicular to each other, at least one of said axes being inclined relative to said platform and displaced from the geographic meridian, and including a pair of pendulums on said platform, computing means for applying the pendulum outputs to said gyroscopes, control means for said platform and second computer means actuated by said gyroscopes for energizing said control means.

References Cited in the file of this patent

UNITED STATES PATENTS

| | | |
|---|---|---|
| 2,707,400 | Manger | May 3, 1955 |
| 2,762,123 | Schultz et al. | Sept. 11, 1956 |
| 2,835,131 | Vacquier et al | May 30, 1958 |